United States Patent [19]

Musgrave

[11] 4,315,378

[45] Feb. 16, 1982

[54] INACTIVE SPRING ASSEMBLY

[76] Inventor: Daniel D. Musgrave, 8201 Caraway St., Cabin John, Md. 20731

[21] Appl. No.: 55,357

[22] Filed: Jul. 6, 1979

Related U.S. Application Data

[63] Continuation-in-part of Ser. No. 968,215, Dec. 11, 1978, Pat. No. 4,205,474.

[51] Int. Cl.³ .................. F41C 25/02; F16F 1/18; F16F 1/22
[52] U.S. Cl. .................................... 42/50; 267/165
[58] Field of Search .............. 42/50; 267/165, 164, 267/158

[56] References Cited

U.S. PATENT DOCUMENTS

| 3,039,221 | 6/1962 | Musgrave | 42/50 |
| 3,964,199 | 6/1976 | Musgrave | 42/50 |
| 3,999,319 | 12/1976 | Musgrave | 42/50 |
| 4,205,474 | 6/1980 | Musgrave | 42/50 |
| 4,252,302 | 2/1981 | Musgrave | 42/50 |
| 4,258,495 | 3/1981 | Musgrave | 42/50 |

Primary Examiner—Charles T. Jordan

[57] ABSTRACT

A spring assembly adapted for long-term installation in a limited space, in a minimum-stress condition. When thrust is desired, the assembly is activated by adjusting the position of some components, resulting in a tendency for it to expand in a predetermined direction.

14 Claims, 10 Drawing Figures

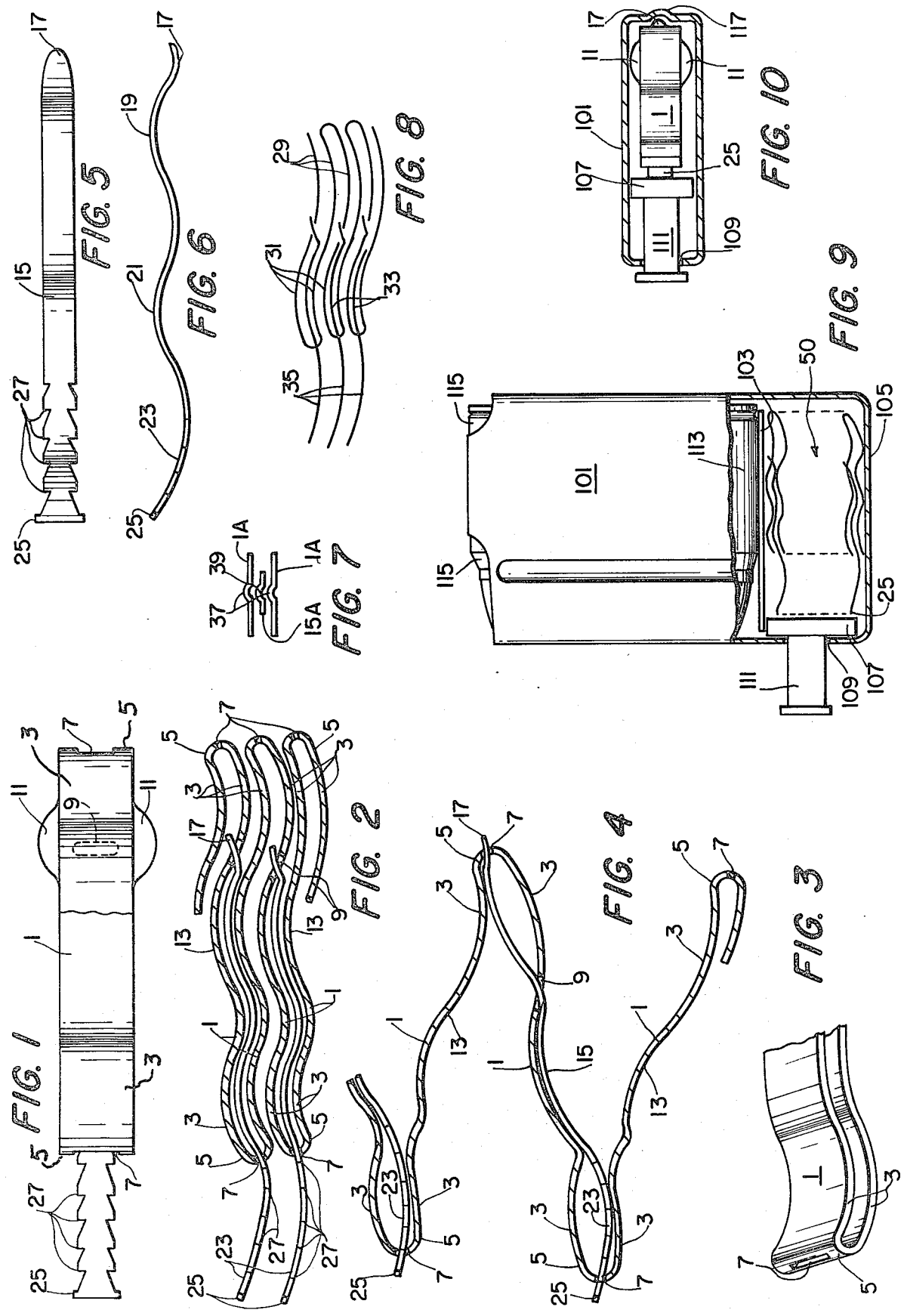

INACTIVE SPRING ASSEMBLY

This application is a continuation-in-part of co-pending application Ser. No. 968,215 filed Dec. 11, 1978, now U.S. Pat. No. 4,205,474, and entitled Inactive Spring.

Many types of mechanical equipment include springs which must stand-by in a stressed condition for long periods of time. An obvious limitation on such springs is the possibility that resilience may be lost, thus rendering the mechanism inoperable.

An example of this problem is found in the ordinary cartridge magazine for firearms. For military use it would be desirable to fill the magazine with cartridges at a factory and issue it to the user in a protective wrapper. This cannot be done because of the limitation of time for keeping the magazine spring stressed. As a result, magazines and ammunition must be stored, shipped, and issued separately, an inefficient and inconvenient procedure.

The principal object of this invention is to provide a spring assembly which can be installed in a minimum space, while in a minimal-stressed condition, and can be adjusted within the same space to a highly-stressed condition.

Another object of this invention is to provide such an assembly which will be economical to fabricate.

These and other objects of the present invention will become apparent upon reference to the following specification, taken in connection with the accompanying drawings, wherein:

FIG. 1 is a top view of an inactive spring assembly in a relaxed condition.

FIG. 2 is a longitudinal section of the assembly shown in FIG. 1.

FIG. 3 is a detail of a vertex of the assembly shown in FIG. 1 and FIG. 2.

FIG. 4 is a section similar to FIG. 2 but the assembly is stressed and expanded.

FIG. 5 is a top view of a wedge.

FIG. 6 is a side view of the wedge shown in FIG. 5.

FIG. 7 is an alternate detail for the spring assembly.

FIG. 8 is a sketch of a simplified inactive spring assembly.

FIG. 9 shows a cartridge magazine, partly sectioned, with an inactive spring assembly installed therein.

FIG. 10 is a horizontal section of the magazine shown in FIG. 9, showing how the spring assembly is activated.

The drawings have been prepared for the purpose of disclosing the invention, and they do not show any particular magazine. In actual practice, this invention can be applied to various types of magazines and also to other types of equipment. The drawings should not be construed as limitations on the invention.

Referring to the drawings in detail, FIG. 1 shows an inactive spring assembly including a resilient, folded leaf 1 having a plurality of arcuate portions 3. The several arcuate portions are positioned near vertexes 5 which are formed by the folds of the leaf.

Through each vertex is formed a passage 7, which may be clearly seen in FIG. 3. For convenience of disclosure, the vertex portion in FIG. 3 has been inverted. It will be noted both in FIG. 1 and in FIG. 3 that the pairs of arcuate portions 3 adjacent to each vertex are adapted for nesting closely together.

Formed in each alternate fold of leaf 1 is another passage 9, the purpose of which will be explained later. Passage 9 of course reduces the resilience of leaf 1 at the place where it is located. To compensate for this a pair of ears 11 are formed along the edges of the leaf near the passage. The ears are shown in FIG. 1.

For convenience, the passages through the vertexes will be referred to as first passages, while passages 9 through the alternate folds of the leaf will be referred to as second passages.

Arcuate portions 3 at each end of the folded leaf are connected by curved portions 13. The principal purpose of the curved portions is to lengthen the folds. The reason such portions should be curved will become apparent from the further description of the assembly which follows.

In FIG. 5 there is shown a wedge 15 having a pointed portion 17. The wedge also has a head 25 near which is formed a plurality of teeth 27, positioned along the edges of the wedge.

FIG. 6 shows that the wedge is not flat. When viewed from the side it comprises three arcuate portions 19, 21, and 23. It will be noted that portion 23 is oriented oppositely to portions 19 and 21.

Wedge 15 is adapted for insertion into passage 7 in a vertex of the folded leaf as shown in FIG. 1 and FIG. 2. The geometry of portions 19 and 21 is so chosen that these portions can nest between pairs of arcuate portions 3 and pairs of curved portions 13, respectively. This situation is clearly shown in FIG. 2, where both the folded leaf and the wedges are relaxed.

At the same time pointed portion 17 of each wedge has entered slightly into second passage 9 in the folded leaf. Of course, the geometry of the wedge and of the leaf must be selected so as to permit this.

When it is desired to have the assembly expand, each wedge is pushed through the first and second passages until head 25 contacts vertex 5. As the wedge moves successive teeth 27 will engage the edge of passage 7, and counter any tendency for the wedge to back out. The teeth may be upset or twisted to better engage in the passage. As considerable friction will be encountered during insertion of the wedge, the folded leaf, the wedge, or both, may be coated with a lubricant.

It should be understood that the wedge in FIG. 2 is oriented similarly to that shown in FIG. 6. A particular relationship of the wedge and the folded leaf is necessary for correct functioning.

When the wedge has been completely inserted, arcuate portions 19 and 23 on the wedge will be oriented oppositely to the pairs of arcuate portions 3 on the folded leaf between which they are positioned. Both the wedge and the folded leaf will be stressed, and they will tend to expand vertically to somewhat the condition shown in FIG. 4. During this expansion the resistance to bending at the vertexes is determined by the section of material there, adjacent to passage 7. A hinging effect is achieved by the reduced cross-section there.

Pointed portion 17 is arranged so as to slide to the end of a fold in the leaf and pass slightly through a passage 7. The wedge is then firmly retained in position by several distinct means as follows. It passes through a first passage 7 at each end of the assembly, and through a second passage 9 in a fold of the leaf. It is prevented from sliding by head 25 which contacts vertex 5, and by the engagement of teeth 27 in first passage 7. The assembly, comprising the folded leaf and a plurality of wedges, can thus act as a unit.

It will be noted that the arcuate portions of each end of the folded leaf are shown oppositely oriented. This should not be considered a limitation of the disclosure, as the drawings are exemplary only. It should also be pointed out that the wedge could include flat portions. The principle of this invention can be applied by using several geometrical variations of wedge and folded leaf.

FIG. 8 is a sketch showing an inactive spring assembly wherein each fold of the leaf comprises two oppositely-oriented arcuate portions 29 and 31. The wedge also comprises two oppositely-oriented arcuate portions, 33 and 35. The wedge is shown partly inserted. It is readily apparent that fully inserting the wedge will place arcuate portions of the leaf and the wedge in opposition, and will thereby tend to expand the assembly. It is also possible to use more than three arcuate portions on each fold of the leaf in an inactive spring assembly, in which case the wedge, of course, would need an equal number of arcuate portions.

FIG. 7 shows an alternate feature. Portions of the leaf 1A are provided with stiffening ribs 37. Similar ribs 39 are provided on wedge 15A. The ribs on the leaf and on the wedge are adapted for nesting.

FIG. 9 shows a cartridge magazine for a firearm comprising a casing 101, a cartridge follower 103, and a floor 105. A pusher block 107 is installed near the front of the magazine between the follower and the floor. The block includes a lug 111 which passes through a hole 109 in the front wall of casing 101. A cartridge 113 rests on the follower and another cartridge 115 is partly visible at the feed end of the magazine.

Also positioned between the follower and the floor is an inert spring assembly 50, which is arranged substantially like that in FIG. 2. The spring assembly being in a relaxed condition and the magazine being filled with cartridges, it can remain so for long periods of time, without spring fatigue. There will be no significant thrust on the casing, an important consideration when certain materials, such as plastics, are used in the casing.

To use the magazine, block 107 is pushed in as shown in FIG. 10, thus inserting the wedges completely into passages 7, so that the assembly is in a condition like that in FIG. 2. It can then exert a lifting force on the follower and the cartridges. A suitable recess 117 is provided in casing 101 for point 17 of the wedge.

What I claim is:

1. An inactive spring assembly comprising: a compactly folded resilient leaf including a plurality of vertexes; nested arcuate portions on said leaf adjacent to each of said vertexes; a first passage formed through said leaf at each of said vertexes; a second passage formed through each alternate fold of said leaf; and wedge means positionally adapted for insertion between said arcuate portions via said first and said second passages thereby tending to separate folds of said leaf.

2. An assembly as set forth in claim 1 wherein the resilience of said leaf is reduced in the vicinity of said first passage.

3. An assembly as set forth in claim 1 wherein the width of said leaf is increased in the vicinity of said second passage.

4. An assembly as set forth in claim 1 wherein the number of said vertexes is twice as great as the number of said wedge means.

5. An assembly as set forth in claim 1 wherein at least one of the recited elements is coated with a lubricant.

6. An assembly as set forth in claim 1 wherein each of said wedge means is positionally adapted for insertion between two pairs of said nested arcuate portions.

7. An assembly as set forth in claim 1 wherein said wedge means includes means adapted for limiting said insertion.

8. An assembly as set forth in claim 1 wherein said wedge means includes detent means adapted for maintaining said insertion.

9. An assembly as set forth in claim 1 wherein said wedge means includes at least one arcuate portion.

10. An assembly as set forth in claim 9 wherein said insertion can be accomplished with an arcuate portion of said wedge means between a pair of arcuate portions of said leaf, with said arcuate portion of said wedge means being oppositely oriented relative to said arcuate portions of said leaf.

11. An assembly as set forth in claim 9 wherein said wedge means includes a plurality of arcuate portions, at least one of said plurality being oriented oppositely to at least one other of said plurality.

12. An assembly as set forth in claim 1 wherein said arcuate portions positioned on each fold of said leaf are connected by another arcuate portion.

13. An assembly as set forth in claim 1 having nested arcuate portions at two ends, said nested arcuate portions at one of said ends being oriented oppositely to said nested arcuate portions at the other of said ends.

14. A cartridge magazine for a firearm comprising: a casing for storing a stack of cartridges, said casing including an exit port with at least one lip; a follower in said casing adapted for urging said stack toward said port; a floor affixed to said casing; an inactive spring assembly positioned between said follower and said floor, said assembly comprising; a compactly folded resilient leaf including a plurality of vertexes; nested arcuate portions on said leaf adjacent to each of said vertexes; a first passage formed through said leaf at each of said vertexes; a second passage formed through each alternate fold of said leaf; and wedge means positionally adapted for insertion between said arcuate portions via said first and said second passages thereby tending to separate folds of said leaf and thrust said follower away from said floor.

* * * * *